United States Patent [19]

Takaya et al.

[11] 4,038,225

[45] July 26, 1977

[54] THERMOSETTING HIGH SOLID COATING COMPOSITION

[75] Inventors: Yasuo Takaya; Tadashi Watanabe; Naozumi Iwasawa, all of Hiratsuka, Japan

[73] Assignee: Kansai Paint Company, Ltd., Japan

[21] Appl. No.: 582,700

[22] Filed: June 2, 1975

[30] Foreign Application Priority Data

June 6, 1974 Japan .................................. 49-63416

[51] Int. Cl.$^2$ .............................................. C09D 3/52
[52] U.S. Cl. .................. 260/21; 260/22 CQ; 260/22 R; 428/416
[58] Field of Search .................. 260/21, 22 CQ, 22 R, 260/22 M

[56] References Cited

U.S. PATENT DOCUMENTS

| 3,325,428 | 6/1967 | Graver et al. ..................... 260/22 R |
| 3,383,342 | 5/1968 | Stephens ................................. 260/21 |
| 3,481,891 | 12/1969 | Boylan et al. .......................... 260/21 |
| 3,711,434 | 1/1973 | Watanabe et al. ..................... 260/21 |
| 3,714,090 | 1/1973 | Lasher ................................... 260/21 |
| 3,920,595 | 11/1975 | Anderson et al. ............. 260/22 CQ |

Primary Examiner—Ronald W. Griffin
Attorney, Agent, or Firm—Ostrolenk, Faber, Gerb & Soffen

[57] ABSTRACT

A thermosetting high solid coating composition which is characterized in that said composition consumes less solvents in production, evolves less solvent vapor in use, and consists of: (a) 80 to 60 parts by weight of alkyd resin having a fatty acid content of 10 to 20% by weight, a phenyl group content of 10 to 25% by weight and a dibasic acid ratio and a hydroxyl group equivalent within certain ranges, (b) 20 to 40 parts by weight of melamine resin mainly comprising hexakisalkoxymethylmelamine, (c) if desired, alcohol modified melamine resin replacing not more than one half of said melamine resin (b), (d) 0.05 to 1.00 part by weight of aliphatic or aromatic sulfonic acid or their amine salts, and (e) 70 to 20 parts by weight of solvents at the time of spray coating.

10 Claims, No Drawings

THERMOSETTING HIGH SOLID COATING COMPOSITION

BACKGROUND OF THE INVENTION

This invention relates to a thermosetting high solid coating composition. More particularly, the invention relates to a thermosetting high solid coating composition which can be spray-coated at about 70° C or below.

In recent years, serious world-wide problems have arisen in that several resources are running low and public nuisance such as air pollution is increasing. In the paint industry, these problems have also been addressed in order to alleviate the same.

For the simultaneous solution of these two problems it is very effective to make a high solid paint as compared with conventional paint. In other words, by high solid paint, the use of solvents which do not form the coating film can be decreased and the evaporation of solvent vapor during the drying process can be reduced. Therefore it will do much toward the saving of paint resources.

BRIEF SUMMARY OF THE INVENTION

It is therefore an object of the present invention to provide an improved coating composition which is adequate to solve the above problems.

Another object of the present invention is to provide a coating composition which is helpful in saving raw materials and preventing air pollution.

A further object of the present invention is to provide a coating composition which contains little solvent and volatilizes little solvent vapor during the step of film formation.

Still a further object of the present invention is to provide a coating composition which has excellent coating film properties in spite of the above-mentioned features.

Pursuant to the above objects, the inventors of the present invention have carried out eager and extensive studies in order to make the coating composition high solid and as the result they have found that the amount of solvents to be used can be reduced to a value from about one half to one seventh as compared with the conventional coating compositions without impairing any properties of thermosetting coating compositions.

When spray coating is carried out by using a conventional coating composition, about 150 parts by weight of solvent is to be added to 100 parts by weight of solid content in the composition so as to make the viscosity suitable for the spraying, such as 100 to 50 centistokes at a coating temperature. In the present invention, the above amount of solvent at the time of spray coating can be reduced to a value from about one half to one seventh, that is about 70 to 20 parts by weight.

Furthermore by using the coating composition of the present invention, the amount of evaporation of the solvents during the film forming step between the coating and baking, the so-called setting process, can be reduced to a great extent. Since the volume of ventilation is large in this setting process, it is difficult to carry out the treatment by burning, adsorbing or absorbing of the evaporated solvent. Therefore, decreasing the evaporation of solvent enhances the effect of the present invention conjointly with the above-mentioned reduction in the amount of solvent to be used.

As the measures to make the coating composition high solid, the molecular wieght of resin component in the vehicle may be decreased and the cohesive force of the composition is weakened so as to enhance the solubility of resin component. It has been considered that much aliphatic material is to be used rather than aromatic material in the preparation of the resin. However, even though a high solid coating composition is attained by the above measure, satisfactory properties as a thermosetting coating composition can not be obtained.

As the result of studies on the high solid coating composition without losing the practical properties, it has been found that a purpose can be attained only by a composition of a narrow range as defined in the present invention below.

The thermosetting high solid coating composition usable for spray-coating at a temperature of about 70° C or below of the present invention comprises:

a. 80 to 60 parts by weight of alkyd resin comprising dicarboxylic acid, monocarboxylic acid, fatty acid, glycol and tri- or higher polyhydric alcohol and having a fatty acid content of 10 to 20% by weight and a phenyl group content of 10 to 25% by weight, and further the hydroxyl group equivalent and dibasic acid ratio (the molar ratio of dibasic acid/polydydric alcohol of said resin existing on the four sides of or within the tetragon defined by four points of (300, 0.700), (300, 0.775), (500, 0.775) and (500, 0.850) on a coordinates of said hydroxyl group equivalent as abscissa and said dibasic acid ratio as ordinate, b. 20 to 40 parts by weight of melamine resin mainly comprising hexakisalkoxymethylmelamine as reppresented by the following general formula:

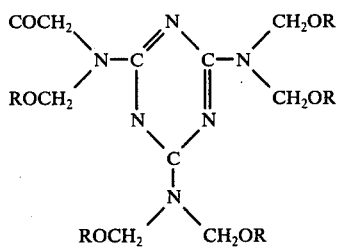

in which 2 to 6 of R's are alkyl groups having each 2 to 4 carbon atoms and the remainder R's are methyl groups, c. if necessary, other melamine resin replacing less than one half of said melamine resin (b) to form 100 parts by weight of a mixture of (a), (b) and (c), said other melamine resin containing not more than 5.5 moles of combined formaldehyde on an average per one mole of the melamine resin and being modified with alcohol having 1 to 4 carbon atoms, d. 0.05 to 1.00 parts by weight of aliphatic or aromatic sulfonic acid or its amine salt, to 100 parts of said mixture, and e. 80 to 20 parts by weight of solvent to 100 parts by weight of said mixture, at the time of spray coating said solvent being able to dissolve simultaneously the components in said mixture, said mixture further may contain dyes, pigments and other additives.

DETAILED DESCRIPTION OF THE INVENTION

In the present invention, the molecular weight of alkyd resin is lowered by adjusting the molar ratio of dibasic acid/polyhydric alcohol (hereinafter referred to as "dibasic acid ratio") to 0.70 to 0.85. In the conventional polyester resin, this dibasic acid ratio is generally in the range of 0.95 to 1.0, so that when the condensation degrees are the same, the number average polymerization degree of the alkyd resin of the present invention is not more than about one third of that of the conventionally used resin.

However, though the high solid coating material may be obtained by decreasing the molecular weight of the resin, it is accompanied by a worsening of the curing property, and therefore a coating material which gives excellent film properties can not be obtained.

Therefore a variety of studies have been carried out in order to overcome the degradation of film properties by the lowering of molecular weight and as the result, it has been successfully found that the worsening of curing property by the lowering of molecular weight can be compensated by adjusting the hydroxyl group equivalent and dibasic acid ratio of the alkyd resin to the foregoing range and that appropriate hardness and flexibility are imparted to the formed coating film by introducing certain amounts of phenyl groups and fatty acids to the resin.

In the present specification, the term "hydroxyl group equivalent" means the quantity in grams of alkyd resin per one mole of hydroxyl group, "phenyl group content" means the percentage by weight of benzene nucleus in the alkyd resin, and "fatty acid content" is defined by the following formula:

$$\text{Fatty acid content (\%)} = \frac{\text{Fatty acid (g) in alkyd resin composition}}{\text{Formed alkyd resin (g)}} \times 100$$

When the hydroxyl group equivalent is plotted as abscissa and the dibasic acid ratio as ordinate on rectangular coordinates, at any point above the straight line connecting the points (300, 0.775) and (500, 0.850), the viscosity of the coating composition becomes so high that the composition can not be used for the purpose of the present invention. While in the region below the line connecting the points (300, 0.700) and (500, 0.775), the curing property is not satisfactory. Further on the left of the line connecting the points (300, 0.700) and (300, 0.775), the cohesive force of the composition becomes too large which causes several defects such as cratering, cissing and crawling, and therefore coating compositions with satisfactory properties can not be formed in the above regions. Still further, on the right of the line connecting the points (500, 0.775) and (500, 0.850), the viscosity of resin becomes high and curing property becomes poor, and therefore the composition in this region is not suitable. Thus the preferable values for the diabsic acid ratio and hydroxyl group equivalent must be restricted to the foregoing range.

When the phenyl group content is less than 10%, the resin is too soft and the hardness of the coating film becomes poor. On the contrary, when the phenyl group content is more than 25%, the resin is too high in viscosity and the flexibility of the coating film becomes poor. In case the fatty acid content is less than 10%, the cohesive force of the resin is large and the condition of coating film becomes worse as crawling and cratering are liable to occur. While a fatty acid content of more than 20% is also undesirable since the solvent resistance of coating film becomes worse.

For the amino resin as the curing agent, hexakisalkoxymethylmelamine as the indispensable componet of the present invention is desirable to obtain the high solid coating composition as compared with the ordinary melamine resin because the former is very low in viscosity. On the other hand, when the well known hexatesmethoxymethylmelamine is combined with the above-mentioned alkyd resin, the cohesive force of the composition becomes large and several defects such as crawling and cratering are formed on the coated surface, and therefore it can not be used. In the meantime, the inventors have found that the above defects can be eliminated and the composition can be made low viscosity by substituting alkoxy groups having 1 to 4 carbon atoms for a part of methoxyl groups and containing not more than 5.5 moles of combined formaldehyde on an average per one mole of the melamine resin. However, the reactivity of this melamine resin is so low that a curing catalyst is necessary and when it is used together with the conventional alkyd resin, the stability of coating composition in a high temperature condition becomes low, and therefore, hot spraying at a temperature of about 70° C or below with a high solid coating composition can not be employed. According to the present invention, however, even when the conventionally used melamine resin is employed in a certain amount, the high temperature stability of the composition is good and the hot spraying can be carried out.

Further, the melamine resin of the component (c) of the present invention is not always necessary, however, it is useful for lowering the baking temperature. If the amount of use is within the above-mentioned range, the foregoing effect of the present invention is not, of course, impaired.

As the curing catalyst for the coating composition of the present invention, methasulfonic acid, p-tolnenesulfonic acid and benzenesulfonic acid are especially effective, and the amount of use may be within the range of 0.05 to 1.00 part by weight to 100 parts of the resin mixture of the alkyd resin and melamine resin composition. When the quantity is less than 0.05 part, the curing property is insufficient and when it is more than 1.00 part, the thermal stability becomes low, disturbing the hot spraying operation.

The raw materials for the alkyd resin of the present invention are those which are known well in the art. The dibasic acids are exemplified by aromatic dicarboxylic acids and their anhydrides such as phthalic acid, isophthalic acid, terephthalic acid and their anhydrides; alicyclic dicarboxylic acids and their anhydrides such as hexahydrophthalic acid, tetrahydrophthalic acid, tetrachlorophthalic acid, tetrabromophthalic acid, 3,6-endomethylene-$\Delta^4$-tetrahydrophthalic acid, 3,6-endodichloromethylene-$\Delta^4$-tetrahydrophthalic acid and their anhydrides; aliphatic dicarboxylic acid and their anhydrides such as succinic acid, maleic acid, adipic acid, azelaic acid, sebacic acid and their anhydrides. The above dibasic acids can be used alone or as a mixture of two or more.

Applicable tri- or higher polyhydric alcohols are exemplified by glycerol, trimethylolethane, trimethylolpropane, 1,2,6-hexanetriol and pentaerythritol, and they are used alone or in combination.

Applicable glycols are exemplified by ethylene glycol, propylene glycol, 1,2-butanediol, 1,2-pentanediol, 2,3-pentanediol, 3-methyl-1,2-butanediol, trimethylene glycol, β-butylene glycol, 2,4-pentanediol, 2,2-dimethyltrimethylene glycol, 2,2-dimethyl-1,3-butanediol, 2,2-dimethyl-1,3-pentanediol, 1,5-pentanediol, tetramethylene glycol, 1,4-pentanediol, 3-methyl-2,5-pentanediol, 1,4-hexanediol, 2,5-hexanediol, pentamethylene glycol, 1,5-hexanediol, 1,6-hexanediol and hexamethylene glycol. Further, monoepoxide such as Cardura E (trade mark, glycidyl ester of synthetic tertiary carboxylic acid produced by Shell Chemical Co., U.K.) can also be used as glycol. The above-mentioned materials may be used alone or in combination.

As the fatty acids, one or a mixture of saturated or unsaturated fatty acids each having 6 to 18 carbon atoms and their triglycerides can be used.

Further, as the monocarboxylic acid in order to introduce phenyl groups to the resin, benzoic acid and alkyl-substitued benzoic acids such as methylbenzoic acid and p-tert-butylbenzoic acid are also used alone or in combination.

As the method for producing the alkyd resin, the well known methods such as fused condensation and/or azeotropic condensation can be employed.

The melamine resin (b) can be easily synthesized by subjecting hexakismethoxymethylmelamine to ether interchange with alcohols each having 2 to 4 carbon atoms in the presence of strong acid such as nitric acid, sulfonic acid, hydrochloric acid, phosphoric acid, etc. at a temperature below 70° C.

As the melamine resin (c), most of the conventionally used melamine resins or described above are included.

As the sulfonic acids, usable are alkylsulfonic acids such as methanesulfonic acid, ethanesulfonic acid, 1-propanesulfonic acid 2-propanesulfonic acid, etc., benzenesulfonic acid, naphthalenesulfonic acid, alkylbenzenesulfonic acids such as p-toluenesulfonic acid, 4-ethylbenzenesulfonic acid, 4-propylbenzene sulfonic acid, n-butylbenzenesulfonic acid, n-octylbenzenesulfonic acid, n-cetylbenzenesulfonic acid, n-octadecylbenzenesulfonic acid, etc., and their organic amine salts such as p-toluenensulfonic acid morpholine salt, p-toluenesulfonic acid triethylamine salt, etc.

In the present invention, the solvents which simultaneously dissolve respective components of the composition may be used without any special restriction so that no different consideration from the conventional paint manufacturing is required in view of the solvents.

That is, one member or a mixture, of a aromatic hydrocarbons (for example, xylene and toluene), alicyclic hydrocabons (for example, ethylcyclohexane), aliphatic hydrocarbons (for example, nonane and decane), alcohols (for example, n-butyl alcohol and isopropyl alcohol), esters (for example, ethylene glycol monomethyl ether and ethylene glycol monoethyl acetate), glycol ethers (for example, ethylene glycol monoethyl ether) and ketones (for example, methyl ethyl ketone and methyl butyl ketone) can be used.

In a similar manner as the conventional coating materials, the coating composition of the present invention can be used as clear paint or colored paint by adding suitable dyes or pigments.

Further, several additives such as levelling agent and antiflooding agent can be used in like manner as the conventional coating compositions.

In order that the invention may be more fully understood, preferred examples and various features will be further described, in which the numerals with parts in compositions mean parts by weight unless otherwise indicated.

PRELIMINARY EXAMPLES

Preparation of Alkyd Resin A

A reaction vessel with a stirrer, thermometer and water separator was fed with 74 parts (0.50 mole) of phthalic anhydride, 29.2 parts (0.20 mole) of adipic acid, 67.0 parts (0.50 mole) of trimethylolpropane and 52 parts (0.50 mole) of neopentyl glycol. The contents were heated with stirring and the temperature of the contents was further raised gradually for 3 hours from 160° to 230° C and then, the contents were maintained at 230° C for further 1 hour. In the next step, 17.8 parts (0.10 mole) of p-tert-butylbenzoic acid, 35.7 parts (0.17 mole) of coconut oil fatty acid and 10 parts of xylene were added and the condensation proceeded while removing condensed water by azeotropic distillation at 230° DC. When the acid value became 8.5, the reaction mixture was cooled and it was diluted with 80 parts of xylene and 20 parts of n-butyl alcohol. Thereby a resin solution having a Gardner-Holdt bubble viscosity of H at 25° C and a solid content of 70% by weight was obtained.

The dibasic acid ratio of thus prepared resin was 0.700, and hydroxyl group equivalent 307, phenyl group content 17.9% and fatty acid content 14.0%.

Preparations of Alkyd Resins B to M

In like manner as the above method for the preparation of alkyd resin A, alkyd resins B to M were prepared by using the raw materials shown in the following Tables 1-A to 3-B.

Table 1-A

| | (Alkyd Resins B to E) | | | |
|---|---|---|---|---|
| | Units: parts (moles) | | | |
| Materials | B | C | D | E |
| First Feed | | | | |
| Phthalic anhydride | 85.1 (0.575) | 103.6 (0.70) | 74.0 (0.50) | 103.6 (0.70) |
| Hexahydrophthalic anhydride | 15.4 (0.100) | — | — | — |
| Tetrahydrophthalic anhydride | 15.2 (0.100) | — | — | — |
| Adipic acid | — | 17.5 (0.12) | 38.0 (0.26) | 17.5 (0.12) |
| Trimethylolpropane | 67.0 (0.500) | — | — | — |
| Trimethylolethane | — | 60.0 (0.50) | — | 36.0 (0.30) |
| Pentaerythritol | — | — | 38.1 (0.28) | — |
| Neopentyl glycol | 26.0 (0.250) | — | — | — |
| Ethylene glycol | — | — | 44.6 (0.72) | — |
| 1,6-hexane glycol | 29.5 (0.250) | — | — | — |
| 1,3-butylene glycol | — | 45.0 (0.50) | — | 63.0 (0.70) |
| Second Feed | | | | |
| Coconut oil fatty acid | 42.0 (0.200) | — | 42.0 (0.200) | — |
| Safflower oil fatty acid | — | 50.4 (0.18) | — | 50.4 (0.18) |
| p-tert-butylbenzoic acid | 17.8 (0.100) | — | 17.8 (0.10) | — |
| Benzoic acid | — | 12.2 (0.10) | — | 6.1 (0.05) |
| Xylene | 13 | 13 | 10 | 13 |

Table 1-B

| | (Alkyd Resins B to E) | | | |
|---|---|---|---|---|
| Material | B | C | D | E |
| Solvents | | | | |
| Xylene | 90 | 80 | 68 | 76 |
| n-butanol | — | 20 | 20 | 20 |
| Ethylene glycol monoethyl ether acetate | 20 | — | — | — |
| Characteristics | | | | |
| Solid (%) | 70 | 70 | 70 | 70 |
| Resin acid value | 12.5 | 4.1 | 20.5 | 13.4 |
| Viscosity of 70% solution | I | L | H-I | K-L |

Table 1-B-continued

| (Alkyd Resins B to E) | | | | |
|---|---|---|---|---|
| Material | B | C | D | E |
| Dibasic acid ratio | 0.775 | 0.820 | 0.760 | 0.820 |
| Hydroxyl group equivalent | 428 | 460 | 310 | 594 |
| Phenyl group content (%) | 18.4 | 22.7 | 19.8 | 22.2 |
| Fatty acid content (%) | 15.1 | 18.8 | 18.3 | 19.7 |

Table 2-A

| (Alkyd Resins F to I) | | | | |
|---|---|---|---|---|
| | Units: parts (moles) | | | |
| Materials | F | G | H | I |
| First Feed | | | | |
| Phthalic anhydride | 103.6 (0.70) | 88.8 (0.60) | 85.1 (0.575) | 85.1 (0.575) |
| Hexahydrophthalic anhydride | 38.5 (0.25) | — | 15.4 (0.100) | 15.4 (0.100) |
| Tetrahydrophthalic anhydride | — | — | 15.2 (0.100) | 15.2 (0.100) |
| Adipic acid | — | — | — | — |
| Trimethylolpropane | 67.0 (0.500) | 46.9 (0.35) | 134.0 (1.000) | 40.2 (0.30) |
| Trimethylolethane | — | — | — | — |
| Pentaerythritol | — | — | — | — |
| Neopentyl glycol | 26.0 (0.250) | 67.6 (0.65) | — | 36.4 (0.35) |
| Ethylene glycol | — | — | — | — |
| 1,6-hexane glycol | 29.5 (0.250) | — | — | 41.3 (0.35) |
| 1,3-butylene glycol | — | — | — | — |
| Second Feed | | | | |
| Coconut oil fatty acid | 42.0 (0.200) | 42.0 (0.200) | 42.0 (0.200) | — |
| Safflower oil fatty acid | — | — | — | — |
| p-tert-butylbenzoic acid | — | 17.8 (0.100) | 17.8 (0.100) | 17.8 (0.100) |
| Benzoic acid | — | — | — | — |
| Xylene | 13 | 12 | 14 | 11 |

Table 2-B

| (Alkyd Resins F to I) | | | | |
|---|---|---|---|---|
| Material | F | G | H | I |
| Solvents | | | | |
| Xylene | 82 | 74 | 77 | — |
| n-butanol | — | 20 | 30 | — |
| Ethylene glycol monoethyl ether acetate | 20 | — | — | 84 |
| Characteristics | | | | |
| Solid (%) | 70 | 70 | 70 | 70 |
| Resin acid value | 11.5 | 3.7 | 10.3 | 10.2 |
| Viscosity of 70% solution | $Z_2$-$Z_3$ | E | K | O |
| Dibasic acid ratio | 0.950 | 0.600 | 0.775 | 0.775 |
| Hydroxyl group equivalent | 672 | 329 | 252 | 341 |
| Phenyl group content (%) | 19.8 | 21.5 | 17.7 | 23.1 |
| Fatty acid content (%) | 15.6 | 17.0 | 14.5 | 0 |

Table 3-A

| (Alkyd Resins J to M) | | | | |
|---|---|---|---|---|
| | Units: parts (moles) | | | |
| Materials | J | K | L | M |
| First Feed | | | | |
| Phthalic anhydride | 103.6 (0.70) | 29.6 (0.20) | 119.7 (0.82) | 143.6 (0.970) |
| Hexahydrophthalic anhydride | — | 77 (0.50) | — | — |
| Tetrahydrophthalic anhydride | — | — | — | — |
| Adipic acid | 17.5 (0.12) | 17.5 (0.12) | — | — |
| Trimethylolpropane | — | — | — | 134 (1.00) |
| Trimethylolethane | 90 (0.75) | 60 (0.50) | 66 (0.55) | — |
| Pentaerythritol | — | — | — | — |
| Neopentyl glycol | — | — | — | — |
| Ethylene glycol | — | — | 27.9 (0.45) | — |
| 1,6-hexane glycol | — | — | — | — |
| 1,3-butylene glycol | 22.5 (0.25) | 45.0 (0.50) | — | — |
| Second Feed | | | | |
| Coconut oil fatty acid | — | — | — | 105 (0.500) |
| Safflower oil fatty acid | 100.8 (0.36) | 50.4 (0.18) | 50.4 (0.18) | — |
| p-tert-butylbenzoic acid | — | — | — | — |
| Benzoic acid | 12.2 (0.10) | 12.2 (0.10) | 18.3 (0.15) | — |
| Xylene | 16 | 13 | 13 | 17 |

Table 3-B

| (Alkyd Resins J to M) | | | | |
|---|---|---|---|---|
| Material | J | K | L | M |
| Solvents | | | | |
| Xylene | 100 | 80 | 84 | 110 |
| n-butanol | — | — | 15 | 25 |
| Ethylene glycol monoethyl ether acetate | 20 | 20 | — | — |
| Characteristics | | | | |
| Solid (%) | 70 | 70 | 70 | 70 |
| Resin acid value | 13.1 | 11.3 | 10.6 | 8.6 |
| Viscosity of 70% solution | N | L$^-$ | O | $Z_1$-$Z_2$ |
| Dibasic acid ratio | 0.820 | 0.820 | 0.820 | 0.970 |
| Hydroxyl group equivalent | 494 | 465 | 451 | 636 |
| Phenyl group content (%) | 18.9 | 8.4 | 27.8 | 20.7 |
| Fatty acid content (%) | 31.4 | 18.7 | 19.3 | 29.5 |

Preparation of Alkyd Resin N

The reaction vessel similar to that used for the preparation of alkyd resin A was fed with 35.1 parts (0.04 mole) of soybean oil, 16.1 parts (0.12 mole) of trimethylolpropane, 87.4 parts (0.84 mole) of neopentyl glycol and 0.03 part of litharge, and the contents were then heated and maintained at 210°C for 1.5 hours. After that, the contents were cooled to 180°C and 64.1 parts (0.386 mole) of isophthalic acid and 59.4 pats (0.386 mole) of hexahydrophthalic anhydride were added. This mixture was then heated from 160° to 230°C slowly for 3 hours and it was maintained at 230°C so as to proceed dehydrationcondensation until the acid value became 5.6. After that, the reaction mixture was cooled to 160°C and 103 parts of ethylene glycol monobutyl ether was added to obtain a resin solution of 70% solid and H - I at 25°C in Gardner-Holdt bubble viscosity.

With regard to this resin, the dibasic acid ratio was 0.722, hydroxyl group equivalent 486, phenyl group content 12.2%, and fatty acid content 14.0%.

The above disclosed alkyd resins A to D and N can be used for the present invention and resins E to L are comparative examples and resin M is a typical example of alkyd resin for thermosetting coating composition which is commonly employed at present.

Preparation of Melamine Resin A

A reaction vessel with a stirrer and a device to remove by-product methanol outside the system was fed with 390 parts (1 mole) of Cymel No. 300 (the trademark of hexakismethoxymethylmelamine, 95 to 97% purity, made by American Cyanamide Co.), 184 parts (4 moles) of ethanol and 2.8 parts of 60% nitric acid. The temperature of the reaction system was gradually raised to 60°C and the pressure was simultaneously reduced to 50 to 60 mmHg. The reaction mixture was allowed to react at 60°C for 5 hours while removing by-product methanol outside the system. After the reaction, the reaction mixture was neutralized to pH 8.2 by using a 30% aqueous solution of sodium hydroxide and the neutralized solution is then heated under reduced pressure to the boiling point to eliminate the remaining ethanol. The neutral salt was then removed from the concentrated product by filtration.

The thus obtained material had a solid content of 99.7% and Gardner-Holdt bubble viscosity of 0° to 25°C. According to gas chromatographic analysis of the decomposition product with phosphoric acid, it was understood that the obtained material was alkyl(methyl, ethyl mixed) etherified methylol melamine containing 2.3 of ethoxy groups and no free methylol groups per one melamine nucleus.

Preparation of Melamine Resin B

The reaction vessel similar to that used for the preparation of melamine resin A was fed with 390 parts (1 mole) of Cymel No. 300, 518 parts (7 moles) of n-butanol and 4.2 parts of 60% nitric acid and the reaction proceeded as discribed above.

As the result, alkyl (methyl, n-butyl) etherified methylol melamine having a solid content of 99.2% and Gardner-Holdt bubble viscosity of L at 25°C and containing 4.1 of butoxy group per one melamine nucleus and no free methylol groups was obtained.

Preparation of Melamine Resin C

A reaction vessel with a stirrer, thermometer, water separator and reflux condenser was fed with 126 parts (1.00 mole) of melamine, 450 parts of n-butanol-formalin (containing 40% of formaldehyde, and 6 moles as formaldehyde), and heated with refluxing for 1.5 hours. During this reaction, the pH was maintained at 7.8 to 7.5 by sodium hydroxide solution. Then 500 parts of butanol was added and the pH was adjusted to 7.5 by using phthalic anhydride and further, water was removed through the water separator for 3 hours. Thereafter the mixture of butanol-water-formaldehyde was distilled away until the temperature of the contents became 117°C. Further the solid content was adjusted to 60% by using butanol/xylene mixture. The obtained product had a Gardner-Holdt bubble viscosity of K at 25°C and combined formaldehyde was 5.1 moles per one melamine nucleus.

The melamine resin A and B can be used as the component (b) and melamine resin C, as component (c).

EXAMPLES 1 to 14

Clear coating compositions as shown in the following Tables 4 to 6 were prepared and tested. As the substrates to be coated, 0.8 mm thick mild steel sheets coated with epoxy primer were used. The prepared coating compositions were applied to the surfaces of said substrates by spraying and they were heated and cured at 160°C for 20 minutes. In the following compositions, Examples 6 to 14 are comparative examples. The FIGURES within parentheses indicates the ratios of solids.

Table 4

| Example | 1 | 2 | 3 | 4 | 5 |
|---|---|---|---|---|---|
| Alkyd resin | A100(70) A30(30) | C107(75) B25(25) | B86(60) B40(40) | A100(70) A15(15) | C100(70) A20(20) |
| Melamine Resin | — | — | — | C25(15) | C17(10) |
| Catalyst (*1) | PTS | DTS-MOR | PTS | PTS | MSA |
| Quantity of catalyst | 0.2 | 0.1 | 0.6 | 0.1 | 0.05 |
| Solvent ratio (xylene/butanol) | 8/2 | 8/2 | 8/2 | 8/2 | 8/2 |
| Quantity of solvents | — | 35 | 40 | 27 | 30 |
| Solvents(parts) per 100 parts of solid | 33 | 67 | 66 | 67 | 67 |
| Coating temperature (Temp. at which composition becomes 100 centistokes) | 55° C | 40° C | 23° C | 40° C | 42° C |
| Pencil Hardness | H | H | 2H | 2H | 2H |
| Erichsen film test | 6.5 | 7.5 | 7.5 | 7.5 | 6.5 |
| Impact resistance (cm) (du Pont type, 500g. 0.5 inch φ) | 40 | 45 | 35 | 45 | 40 |
| Gel fraction (%) | 97.2 | 95.3 | 98.6 | 98.2 | 97.8 |
| Immersion test | Good | Good | Good | Good | Good |
| Storage stability | Good | Good | Good | Good | Good |
| State of coated surface | Good | Good | Good | Good | Good |

Notes:
(*1) PTS: p-toluenesulfonic acid
PTS-MOR: p-toluenesulfonic acid morpholine salt
MSA: methanesulfonic acid Table 5

| Example | 6 | 7 | 8 | 9 | 10 |
|---|---|---|---|---|---|
| Alkyd resin | E100(70) | F100(70) | G100(70) | H100(70) | I100(70) |
| Melamine Resin | A30(30) | A30(30) | A30(30) | A30(30) | A30(30) |
| Catalyst | PTS | PTS | PTS | PTS | PTS |
| Quantity of catalyst | 0.2 | 0.2 | 0.6 | 0.2 | 0.2 |
| Solvent ratio (xylene/butanol) | 8/2 | 8/2 | 8/2 | 8/2 | 8/2 |

Table 5-continued

| Example | 6 | 7 | 8 | 9 | 10 |
|---|---|---|---|---|---|
| Quantity of solvents | 33 | 80 | 33 | 33 | 60 |
| Solvents(parts per 100 parts of solid | 63 | 110 | 63 | 63 | 93 |
| Coating temperature (Temp. at which composition becomes 100 Centistokes | 38° C | 65° C | 21° C | 38° C | 52° C |
| Pencil Hardness | B | 2H | 2B | 2H | 2H |
| Erichsen test | 7.0 | 6.5 | 7.0 | 4.5 | 2.5 |
| Impact resistance(cm) (du Pont type, 500g, 0.5 inch φ) | 25 | 35 | 20 | 25 | 35 |
| Gel fraction (%) | 85.5 | 97.2 | 86.2 | 98.3 | 97.9 |
| Immersion test | Swollen | Good | Swollen | Good | Good |
| Storage stability | Good | Gelled | Good | Viscosity slightly increased | Good |
| State of coated surface | Good | Good | Slightly sticky | Many crawling and cratering | Many crawling and cratering |

Table 6

| Example | 11 | 12 | 13 | 14 |
|---|---|---|---|---|
| Alkyd resin | J100(70) | K100(70) | L100(70) | M100(70) |
| Melamine Resin | A30(30) | A30(30) | A30(30) | A30(30) |
| Catalyst | PTS | PTS | PTS | PTS |
| Quantity of catalyst | 0.2 | 0.2 | 0.2 | 0.2 |
| Solvent ratio (xylene/butanol) | 8/2 | 8/2 | 8/2 | 8/2 |
| Quantity of solvents | 33 | 33 | 33 | 80 |
| Solvents(parts) per 100 parts of solid | 63 | 63 | 63 | 110 |
| Coating temperature (Temp. at which composition becomes 100 centistokes) | 48° C | 37° C | 46° C | 63° C |
| Pencil Hardness | B | B | 2H | H |
| Erichsen test | 7.5 | 7.0 | 1.5 | 5.5 |
| Impact resistance(cm) (du Pont type, 500g, 0.5 inch φ) | 40 | 35 | 20 | 35 |
| Gel fraction (%) | 91.3 | 88.5 | 96.3 | 95.5 |
| Immersion test | Swollen | Slightly swollen | Good | Good |
| Storage stability | Viscosity slightly increased | Good | Good | Gelled |
| State of coated surface | Good | Good | Good | Good |

EXAMPLES 15 to 18

In these examples, white enamels were prepared where 100 PHR of rutile type titanium dioxide was dispersed to each 100 parts of vehicle solid. The coating substrates, coating method and curing conditions were the same as those of the preceding examples. By the way, Examples 17 and 18 were comparative examples.

The compositions for the enamels and test result thereof are shown in the following Table 7.

Table 7

| Example | 15 | 16 | 17 | 18 |
|---|---|---|---|---|
| Alkyd resin | B100(70) | N100(70) | B100(70) | B100(70) |
| Melamine resin | A30(30) | A30(30) | A30(30) | A30(30) |
| Titanium dioxide, rutile type | 100 | 100 | 100 | 100 |
| Catalyst | PTS | PTS | PTS | PTS |
| Quantity of catalyst | 0.4 | 0.5 | 0.01 | 1.5 |
| Solvent ratio (xylene/butanol) | 8/2 | 8/2 | 8/2 | 8/2 |
| Quantity of solvents | 104 | 104 | 104 | 104 |
| Solvents(parts) per 100 parts of solid | 67 | 67 | 67 | 67 |
| Coating temperature (Temp. at which composition becomes 100 centistokes | 25 | 21 | 25 | 25 |
| Pencil Hardness | 2H | H | 4B | 2H |
| Erichsen test | 7.5 | 7.0 | 7.5 | 0.5 |
| Impact resistance(cm) (du Pont type, 500g, 0.5 inch φ) | 40 | 40 | 15 | 10 |
| Specular gloss (60°) | 97 | 96 | 97 | 86 |
| Immersion test | Good | Good | Dissolve | Good |
| Storage stability | Good | Good | Good | Gelled |
| State of coated surface | Good | Good | Sticky | Less gloss |

Properties of the coating composition and coated film are determined in accordance with the following method;

1. Pencil Hardness

Leave a coated panel to stand in a constant temperature and constant humidity chamber at a temperature of 20°C and a humidity of 75% for 1 hour. Fully sharpen a pencil (trade mark "UNI", product of Mitsubishi Pencil Co., Ltd., Japan) by a pencil sharpener and then wear away the sharp pencil point to flatness. Firmly press the pencil against the coating surface of the coated panel at an angle of 45° between the axis of the pencil and the coating surface and push the pencil forward at a constant speed of 3 sec/cm as positioned in this state. Repeat the same procedure 5 times with each of pencils having various hardness. The hardness of the coating is expressed in terms of the highest of the hardnesses of the pencil with which the coating remain unbroken at more than 4 strokes.

2. Erichsen test

The coated plate is placed in a constant temperature and humidity chamber kept at 20°C and a humidity of 75% for one hour. Thereafter, the plate was set on Erichsen testing machine with the coating positioned outside. A punch having a radius of 10 mm is pushed outward predetermined distances in contact with the rear face of the plate at as uniform speed as possible of about 0.1 mm/sec. The pushed out portion of the plate is checked by the naked eye for cracking or peeling immediately after pushing out to determine the maximum distance (mm) of stroke of the punch causing no changes on the coating.

3. Impact resistance

After leaving a coated plate to stand in a constant temperature and constant humidity chamber at a temperature of 20°C and a humidity of 75% for 1 hour, the following test is conducted in the same chamber. A bearer and a centor of impact of prescribed sizes are fitted to a Du Pont impact testor and the plate is put between them, turning the coated surface of the plate upward. The prescribed weight is dropped on the center of impact from the prescribed height, the plate is taken out, and after having been left for a hour in the room, the damage of surface is observed. The large height (cm) of the weight entailing no cracking in the coating is determined.

4. Gel fraction

The coated film is peeled off the plate and immersed in acetone to extract acetone-soluble content under the boiling point of acetone. The resulting residue is then dried at a reduced pressure. Gel fraction is calculated from the result according to the following equation.

$$\text{Gel fraction (\%)} = \frac{\text{Weight (g) of film after extraction in acetone}}{\text{Weight (g) of film prior to extraction in acetone}} \times 100$$

5. Specular gloss

JIS K-5400.6.7

6. Immersion test

The coated plate is immersed in gasoline (trade mark: "Silver Gasoline", product of Nippon Oil Co., Ltd., Japan) at 20°C for 24 hours, and the state of coating film is observed.

7. Storage stability

The state of coating composition is observed after the composition has been left to stand at 60°C for 10 days.

What is claimed is:

1. A thermosetting high solid coating composition usable for spray coating at a temperature below 70°C which comprises:

A. a mixture of:
  a. 80 to 60 parts by weight of alkyd resin having a fatty acid content of 10 to 20% by weight and a phenyl group content of 10 to 25% by weight, and further the hydroxyl group equivalent and dibasic acid ratio (the molar ratio of dibasic acid/polyhydric alcohol) of said resin existing on or within the four sides of the tetragon as defined by four points of (300, 0.700), (300, 0.775), (500, 0.775) and (500, 0.8500 on a coordinate of said hydroxyl group equivalent as abscissa and said dibasic acid ratio as ordinate; and
  b. 20 to 40 parts by weight of melamine resin comprising hexakisalkoxymethylmelamine of the formula:

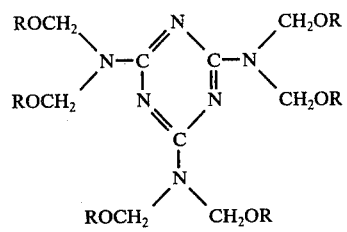

in which 2 to 6 of R's are alkyl groups having each 2 to 4 carbon atoms and the remainder are methyl groups, and an amount up to less than one half of said hexakisalkoxymethylmelamine of another melamine resin containing not more than an average of 5.5 moles combined formaldehyde per one mole of melamine resin and being modified with alcohols of 1 to 4 carbon atoms;

B. 0.05 to 1.00 parts by weight of aliphatic or aromatic sulfonic acid or its amine salt per 100 parts of said mixture; and C. 80 to 20 parts by weight of solvent per 100 parts by weight of said mixture, said solvent being able to dissolve simultaneously the components in said mixture.

2. A thermosetting high solid coating composition as claimed in claim 1, in which said alkyd resin (a) is the condensation reaction product of dicarboxylic acid, monocarboxylic acid, fatty acid, polyhydric alcohol.

3. A thermosetting high solid coating composition as claimed in claim 2, in which said dicarboxylic acid is at least one member selected from the group consisting of aromatic dicarboxylic acids, alicyclic dicarboxylic acids, aliphatic dicarboxylic acids and their anhydrides.

4. A thermosetting high solid coating composition as claimed in claim 1, in which said another melamine resin is not present.

5. A thermosetting high solid coating composition as claimed in claim 1, in which said alkyd resin contains alkyl-substituted benzoic acids.

6. A thermosetting high solid coating composition as claimed in claim 1, in which said aliphatic or aromatic sulfonic acids are alkyl sulfonic acids, benzenesulfonic acid, naphthalenesulfonic acid, alkylbenzenesulfonic acids and their organic amine salts.

7. A thermosetting high solid coating composition as claimed in claim 1, in which said solvent is at least one member selected from the group consisting of aromatic hydrocarbons, alicyclic hydrocarbons, aliphatic hydrocarbons, alcohols, esters, glycol ethers and ketones.

8. A thermosetting high solid composition as claimed in claim 1 wherein said alkyd resin has a fatty acid content of 14.0 to 18.8%, a phenyl content of 12.2 to 22.7%, a hydroxyl group equivalent of 307–486 and a dibasic acid ratio of 0.700 to 0.820.

9. A thermosetting high solid coating composition as claimed in claim 8 wherein in said melamine resin (b), said alkyl groups are ethyl or n-butyl.

10. A thermosetting high solid coating composition as claimed in claim 9 wherein said mixture (A) is of 60 to 70 parts of said alkyl resin and 40 to 25 parts of said melamine resin.

* * * * *